United States Patent
Lim et al.

(10) Patent No.: US 8,526,927 B2
(45) Date of Patent: Sep. 3, 2013

(54) TELEPHONE APPARATUS FOR TRANSFERRING A CELLULAR PHONE CALL TO A HOME PHONE AND MAKING A CELLULAR PHONE CALL BY A HOME PHONE

(75) Inventors: Boonchen Lim, Guangdong (CN); Mingwei Chen, Guangdong (CN); Wenjie Wang, Guangdong (CN); Xiaozhong Huang, Guangdong (CN)

(73) Assignee: Cybio Electronic (Shenzhen) Company Limited, Shenzhen, Guangdong Province (CN)

( * ) Notice: Subject to any disclaimer, the term of this patent is extended or adjusted under 35 U.S.C. 154(b) by 745 days.

(21) Appl. No.: 12/239,823

(22) Filed: Sep. 29, 2008

(65) Prior Publication Data

US 2010/0081380 A1    Apr. 1, 2010

(51) Int. Cl.
*H04M 3/42* (2006.01)
(52) U.S. Cl.
USPC ............ 455/417; 455/426.1; 455/426.2; 455/522.1; 455/462; 455/444; 455/422; 455/452.2; 455/161.3; 379/142.18; 379/283; 379/211.01; 379/214.01; 379/142.07
(58) Field of Classification Search
USPC ............ 455/417, 426.1, 426.2, 522.1, 462, 455/444, 422; 379/142.18, 283, 211.01, 379/214.01, 142.07
See application file for complete search history.

(56) References Cited

U.S. PATENT DOCUMENTS

| | | | | |
|---|---|---|---|---|
| 6,453,164 | B1* | 9/2002 | Fuller et al. | 455/445 |
| 6,766,176 | B1* | 7/2004 | Gupta et al. | 455/550.1 |
| 7,076,031 | B1* | 7/2006 | Bress et al. | 379/23 |
| 7,499,729 | B2* | 3/2009 | Lie et al. | 455/565 |
| 7,715,790 | B1* | 5/2010 | Kennedy | 455/41.2 |
| 2005/0208893 | A1* | 9/2005 | Yueh | 455/41.2 |
| 2006/0148420 | A1* | 7/2006 | Wonak et al. | 455/74.1 |
| 2006/0270347 | A1* | 11/2006 | Ibrahim et al. | 455/41.2 |
| 2006/0293094 | A1* | 12/2006 | Kilpi et al. | 455/575.3 |
| 2007/0143105 | A1* | 6/2007 | Braho et al. | 704/231 |
| 2008/0004002 | A1* | 1/2008 | Chin et al. | 455/425 |
| 2008/0101279 | A1* | 5/2008 | Russell et al. | 370/328 |
| 2008/0192904 | A1* | 8/2008 | Vagelos | 379/88.16 |
| 2010/0027824 | A1* | 2/2010 | Atamaniuk et al. | 381/322 |
| 2010/0081380 | A1* | 4/2010 | Lim et al. | 455/41.2 |

* cited by examiner

*Primary Examiner* — Charles Appiah
*Assistant Examiner* — Edward Zhang
(74) *Attorney, Agent, or Firm* — Cheng-Ju Chiang (57) ABSTRACT

An exemplary telephone apparatus which can transfer a first phone call from a Bluetooth enabled cellular phone to a home phone and, making a second cellular phone call by a home phone via a Bluetooth enabled cellular phone, includes a Bluetooth enabled integrated chip (IC). The IC includes a Bluetooth modem configured for receiving a Bluetooth signal from a Bluetooth radio frequency (RF) antenna of the cellular phone, a central processing unit (CPU) built-in the IC, for switching controlling of transferring between the first phone call and the second phone call, and a digital signal processor (DSP) and a CODEC built-in the IC. The telephone apparatus makes use of digital signal processing technology to generate and decode various tones and signals. The telephone also avoids the problem of distortion of DTMF tone during transmission through a Bluetooth RF.

20 Claims, 14 Drawing Sheets

TELEPHONE APPARATUS FOR TRANSFERRING A CELLULAR PHONE CALL TO A HOME PHONE AND MAKING A CELLULAR PHONE CALL BY A HOME PHONE

BACKGROUND OF THE INVENTION

The present invention relates to telephone apparatus and, particularly to, a telephone apparatus transferring a phone call from a cellular phone to a home phone and, making a cellular phone call by a home phone.

Currently, telephones are universally used in many aspects, it is obviously convenient for a telephone user to receive a call from a cellular telephone call by using a home telephone, and to use a home telephone to make a cellular phone call. And it is also an obvious expectation by the telephone users who frequently send and receive telephone call. However, the important point is that this said cellular and home phone call transfer apparatus should be realized in an economic way. Recently, an apparatus can be connected between the cellular phone and the home telephone, to achieve the above-mentioned functions. The transfer apparatus generally includes a plurality of discrete Integrated Chips (ICs) cooperating to achieve the above-mentioned functions, however, using a plurality of ICs is costly.

Nowadays, Bluetooth Radio Frequency (RF) communication technology is quite mature, and many cellular phones are Bluetooth enabled.

What is needed is to provide a phone apparatus which is inexpensive but with outstanding performance, and can take advantage of Bluetooth technology and Digital Signal Processing (DSP) technology.

BRIEF SUMMARY OF THE INVENTION

An exemplary apparatus which can transfer a first phone call from a Bluetooth enabled cellular phone to a home phone and, make a second cellular phone call by a home phone via a Bluetooth enabled cellular phone, includes a Bluetooth enabled integrated chip (IC). The IC includes a Bluetooth modem configured for receiving a Bluetooth signal from a Bluetooth radio frequency (RF) antenna of the cellular phone, a central processing unit (CPU) built-in the IC, for switching controlling of transferring between the first phone call and the second phone call, and a digital signal processor (DSP) and a CODEC built-in the IC. The CPU includes a buffer. The received Bluetooth signal is processed into speech and, vice-versa, the speech is processed into the Bluetooth signal by the built-in DSP and CODEC in the Bluetooth IC by DSP processing. Dual tone multiple frequency (DTMF) dialing tone, Caller ID frequency shift keying (FSK) signal, channel associated signaling (CAS) tone, call progress tone are also generated and decoded or detected by the built-in DSP by DSP processing. A DTMF and speech signal received from the home phone will be temporary stored in the buffer of the CPU first for DTMF detection, and when DTMF is detected, the DTMF signal will be muted, and the CPU will send a dialing instruction to the cellular phone for dialing a same DTMF tone, instead of sending out the received DTMF tone.

Other objects, advantages and novel features of the invention will become more apparent from the following detailed description when taken in conjunction with the accompanying drawings, in which:

DETAILED DESCRIPTION OF THE INVENTION

Figure 1:
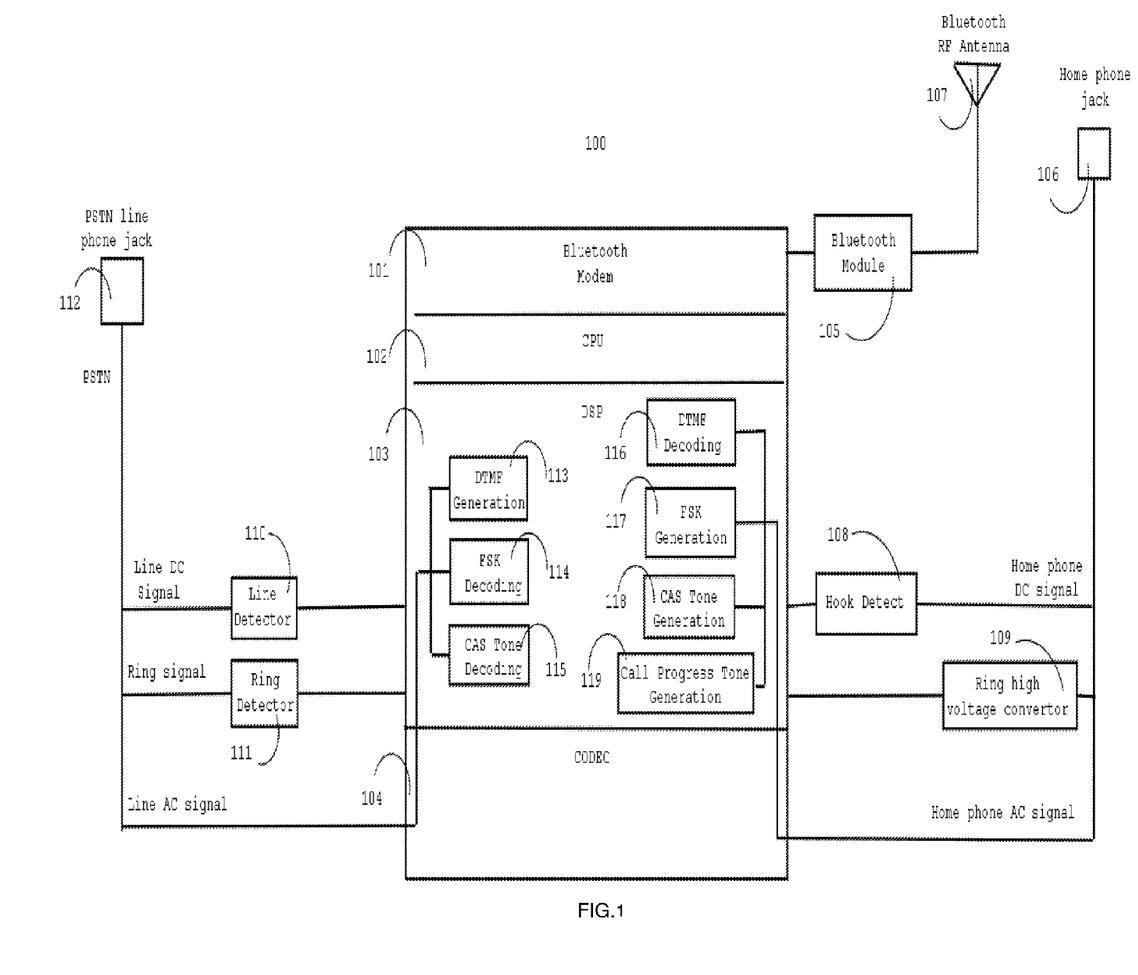
FIG. 1 is a block diagram of an exemplary embodiment of a telephone apparatus, the telephone apparatus using one Bluetooth IC chip to perform dual tone multiple frequency (DTMF) decoding, DTMF generation, frequency shift keying (FSK) signal decoding, FSK signal generation, channel associated Signaling (CAS) tone decoding, CAS generation, and call progress tone generation.

Referring to FIG. 1, an exemplary embodiment of a telephone apparatus includes an integrated chip (IC). The IC includes a Bluetooth modem 101, a central processing unit (CPU) 102, a digital signal processor (DSP) 103, and a CODEC 104. The Bluetooth modem 101, the CPU 102, the DSP 103, and the CODEC 104 are built-in the IC 100.

The Bluetooth modem 101 is electrically connected to a Bluetooth module 105, and the Bluetooth is electrically connected to a Bluetooth radio frequency (RF) antenna 107.

The CPU 102 is used to program various function control. A first signal is received from and sent to a Bluetooth enabled cellular phone via the Bluetooth RF antenna 107. A second signal is received from and sent to a home phone via home phone jack 106. A third signal is received from and sent to a public switched telephone network (PSTN) line via a phone jack 112. Enhancement conversion of Bluetooth RF signal to speech and vice versa, will be detailed later.

The DSP 103 performs dual tone multiple frequency (DTMF) generation 113, DTMF decoding 116, frequency shift keying (FSK) signal decoding 114, FSK signal generation 117, channel associated Signaling (CAS) tone decoding 115, CAS tone generation 118, and call progress tone (such as dialing tone, busy tone, etc.) generation 119, which are all performed by the DSP built-in the IC 100.

Figure 2:
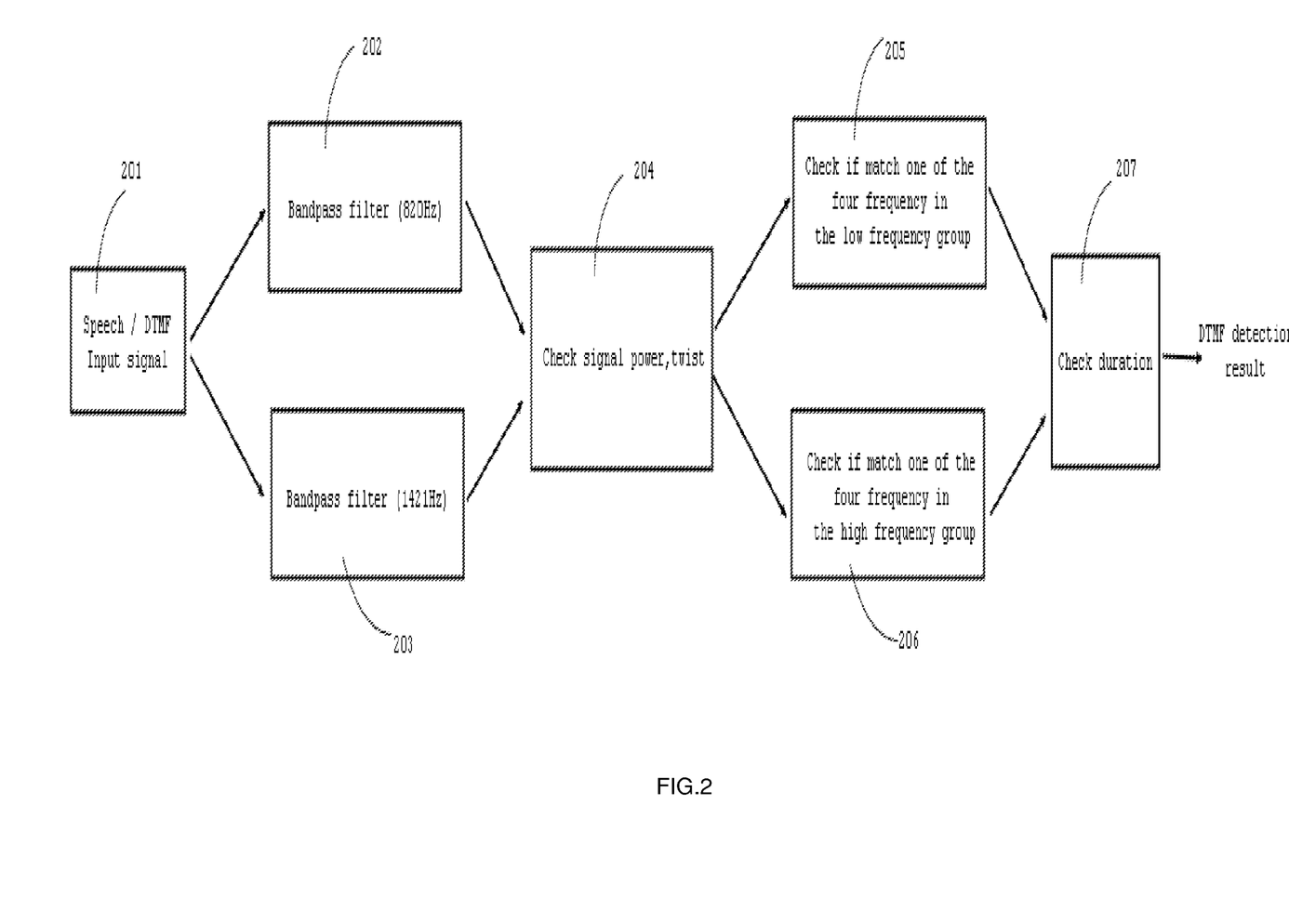
FIG. 2 is a flow chart of the DTMF decoding of FIG. 1.
Figure 2A:
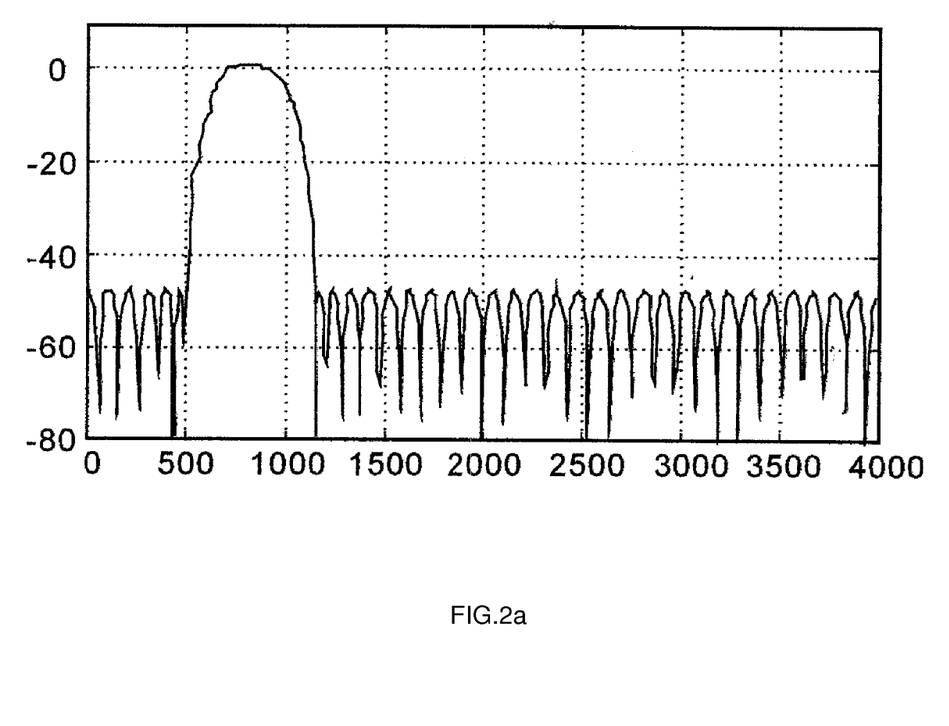
FIGS. 2a and 2b are frequency response of two band pass filters of FIG. 2.
Figure 2B:
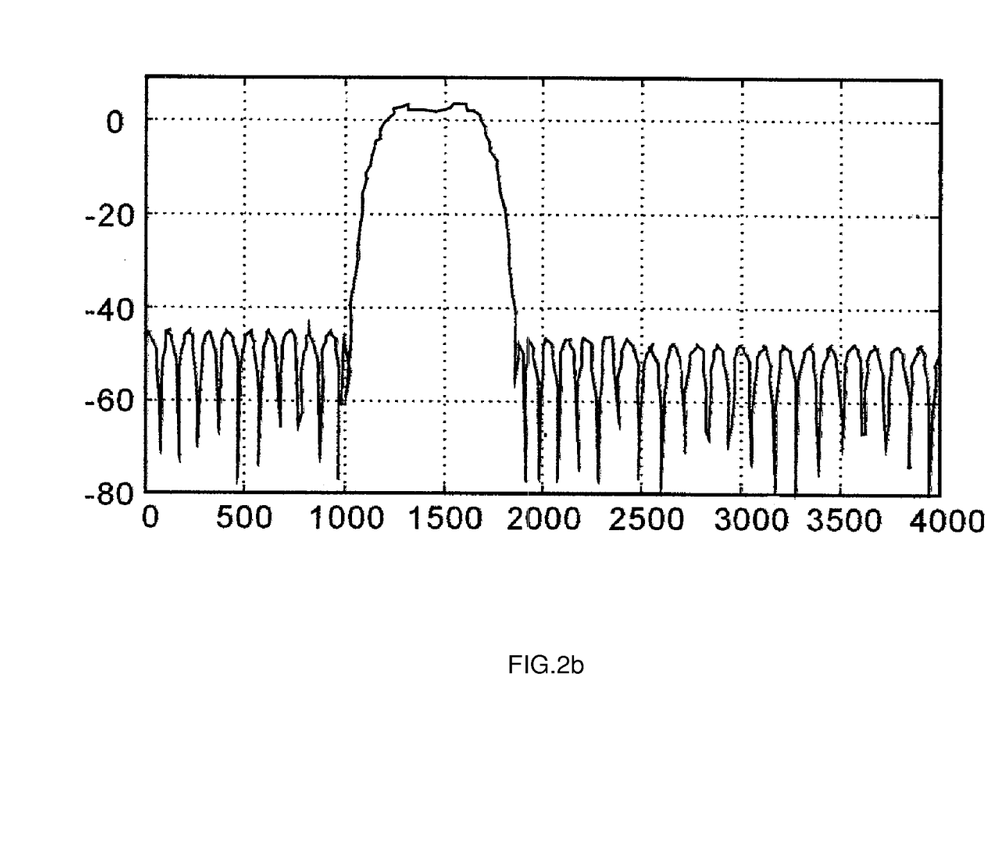

Referring to FIG. 2, firstly, DTMF is the composition of two frequencies, one from a low frequency tone group and the other one from a high frequency tone group. In block 201, speech and DTMF signals are input to two band pass filters. The DSP 103 is used to perform a low frequency 820 Hz band pass filter as shown in block 202 and a high frequency 1421 Hz band pass filter as shown in block 203. The frequency response of the two band pass filters is shown in FIG. 2a and FIG. 2b. Secondly, as shown in block 204, the power level and the twist of the two signals obtained in block 202 and block 203 are checked. If the power level is smaller than −14 dbm, or the twist is not within a range of −3 db and +8 db, then it is determined that no DTMF is detected, and further checking of DTMF would cease. Otherwise, successive checking is continued in block 205 and block 206. In block 205, it is checked by the DSP 103 to see if the low frequency signal is one of 697 Hz, 770 Hz, 852 Hz, and 941 Hz in a low frequency group. In block 206, it is checked by the DSP 103 to see if the high frequency is one of 1209 Hz, 1336 Hz, 1477 Hz, and 1633 Hz in a high frequency group. If it is determined that the frequency of the low frequency signal is matched one of the aforementioned frequency in the low frequency group, and the frequency of the high frequency signal is matched one of the aforementioned frequency in the high frequency group, then it is further checked in block 207 to see if duration of the tone is more than 35 ms. If all these conditions are met, then a DTMF tone is detected.

Figure 3:
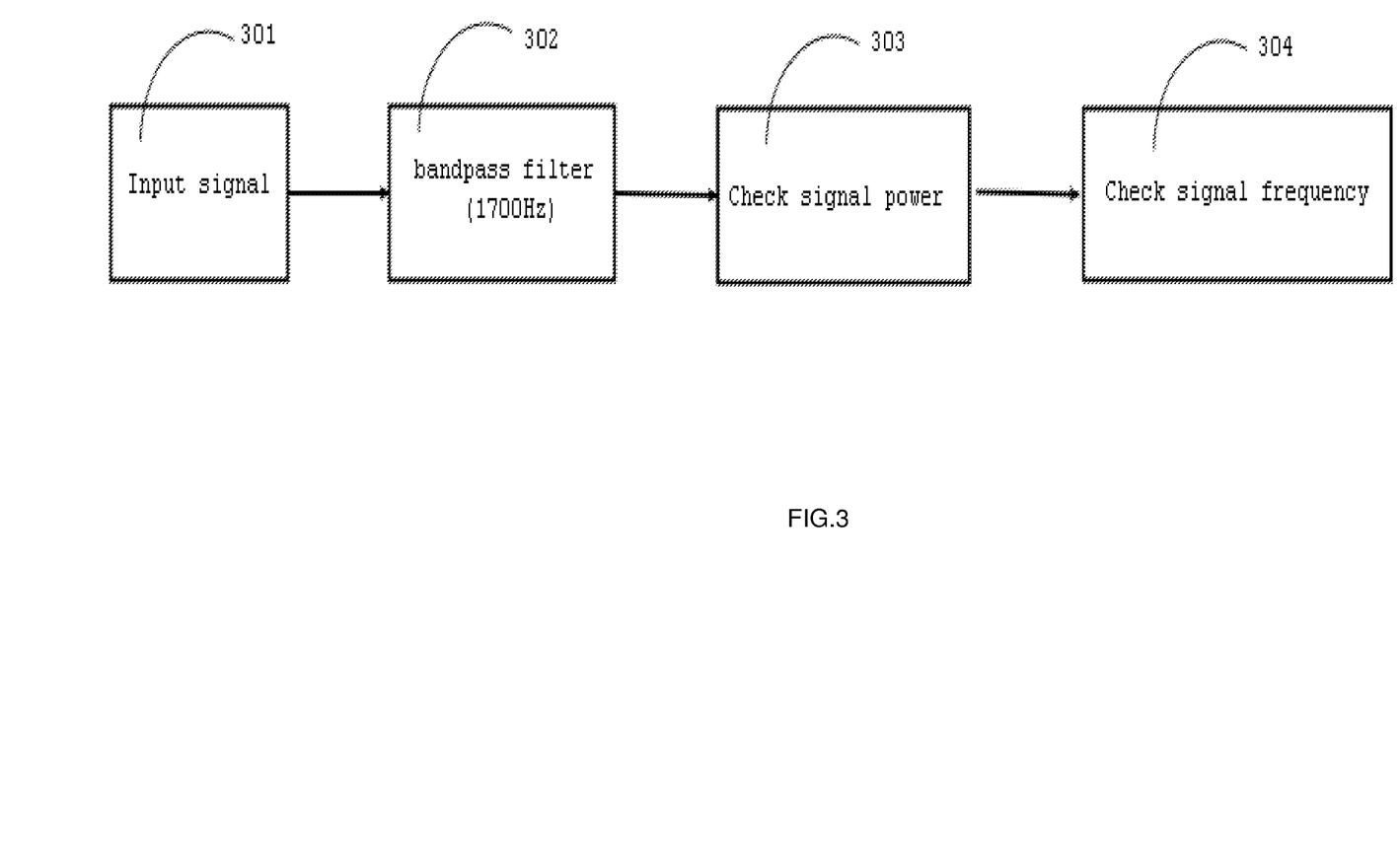
FIG. 3 is a flow chart of the FSK decoding of FIG. 1.
Figure 3A:
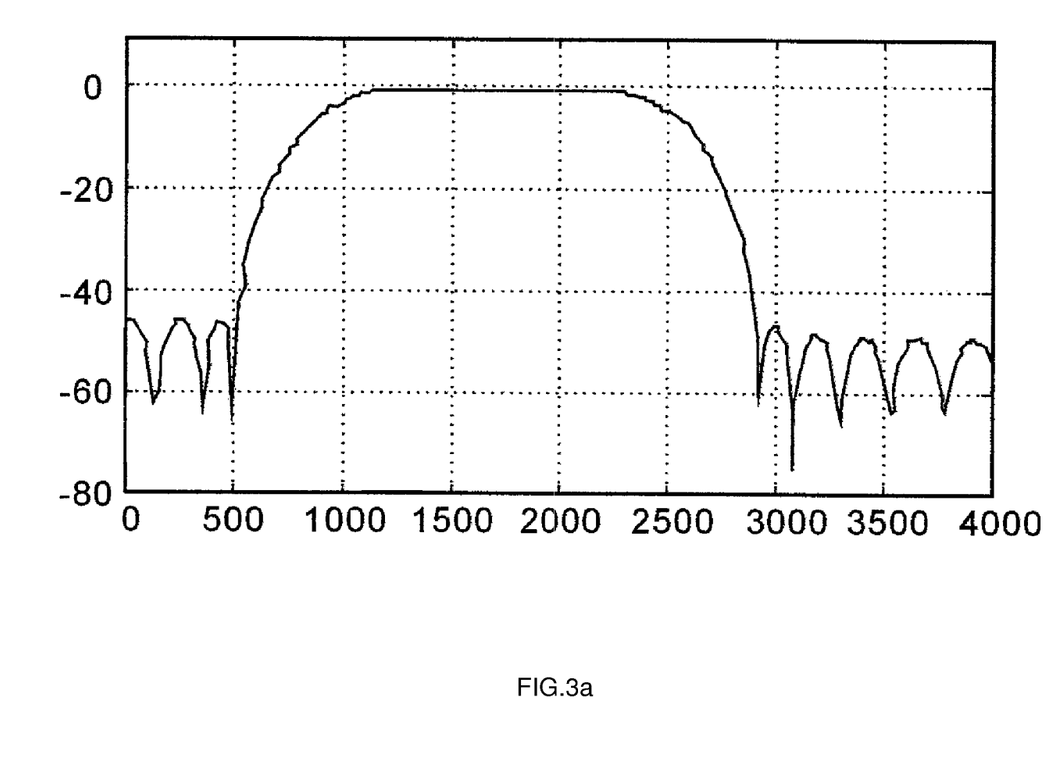
FIG. 3a is frequency response of band pass filter FIG. 3.

Referring to FIG. 3, firstly, in block 301, signals are input to the following band pass filter. In 302, the DSP 103 of FIG. 1 is used to perform a 1700 Hz band pass filter, wherein the frequency response is shown in FIG. 3a. Secondly in block 303, the power level of the signal after the band pass filter in block 302 is checked and compared. If the level is lower than −54 dbm, then it is treated as noise and the processing is ceased. Thirdly block in 304, if the level is higher than −54 dbm, then further the frequency of the signal is checked. If it is lower than 1700 Hz and higher than 1000 Hz, a logic of 1 is outputted. If it is higher than 1700 Hz and lower than 2400 Hz, then a logic of 0 is outputted. Otherwise, it is treated as noise.

Figure 4:
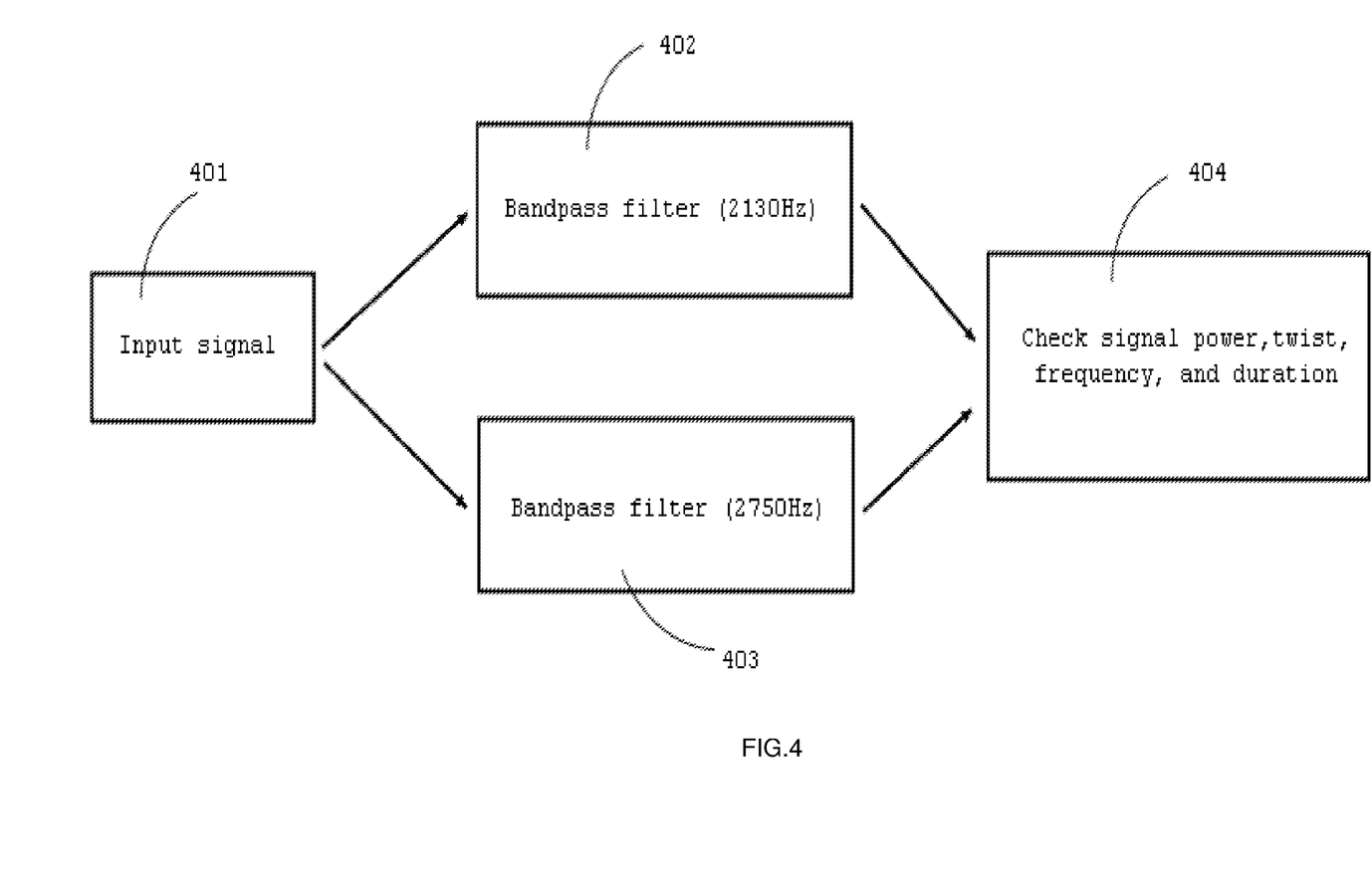
FIG. 4 is a flow chart of the CAS tone decoding of FIG. 1.
Figure 4A:
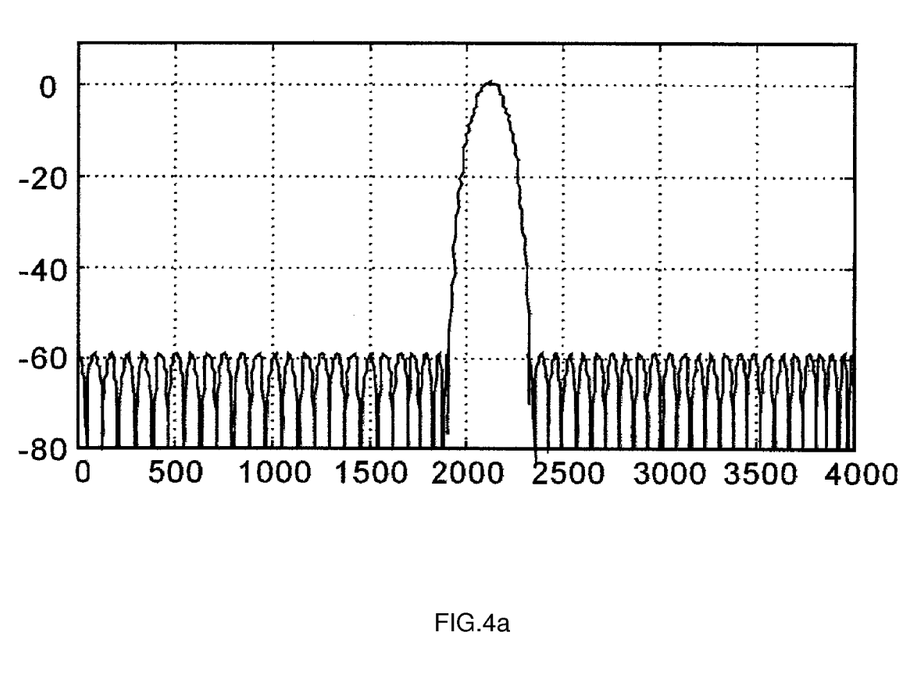
FIGS. 4a and 4b are frequency response of two groups of signals of FIG. 4.
Figure 4B:
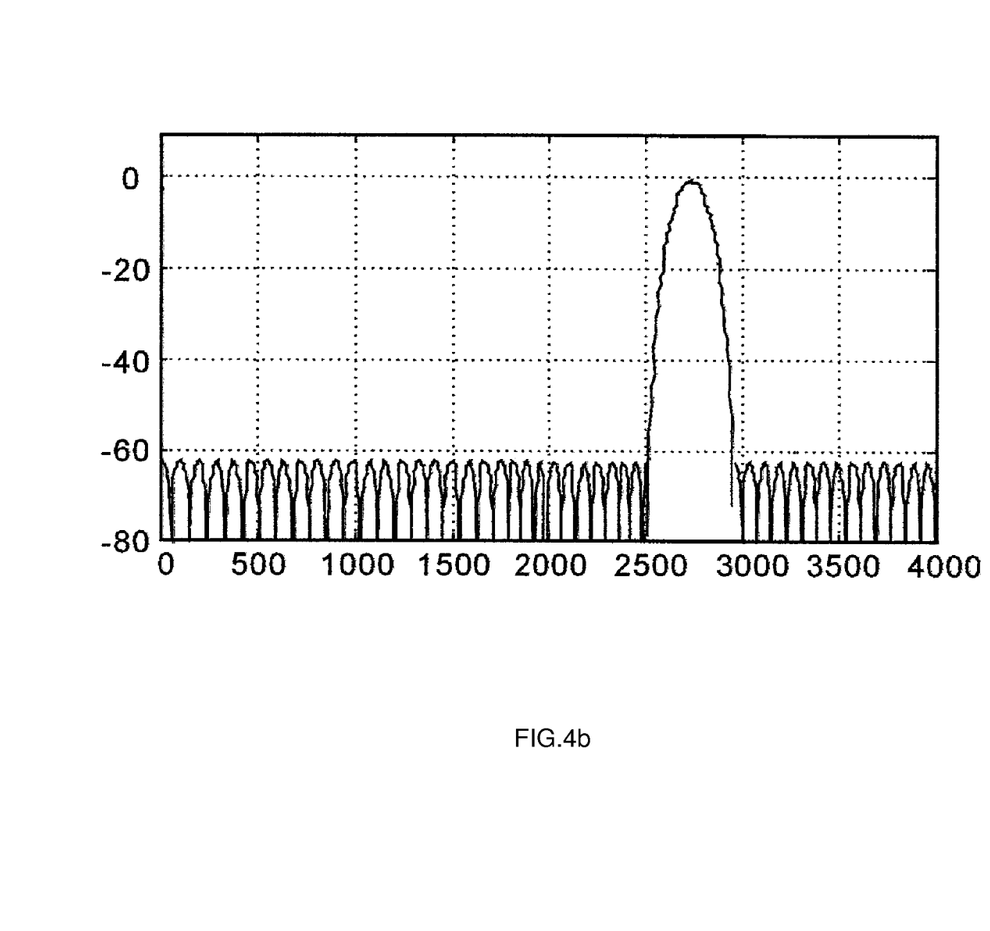

Referring to FIG. 4, CAS tone is composed of two frequency. In block 401, the input signal is fed to two band pass filters. Firstly in block 402, the DSP 103 is used to perform a 2130 Hz band pass filter, and in block 403, the DSP 103 is used to perform a 2750 Hz band pass filter. Two groups of signals, a lower frequency signal and a higher frequency signal are obtained in this way. The frequency responses of the two groups of signals are shown in FIG. 4a and FIG. 4b. Secondly in block 404, the two signals are checked to see if a sum of the power level of these two signals is larger than −33 dbm, if twist between these two signals is less than ±10 db, if a frequency deviation is less than 1.5%, and if duration of the signals is larger than 70 ms but smaller than 100 ms. If all these conditions are met, then it is determined that a CAS tone is detected.

Figure 5:
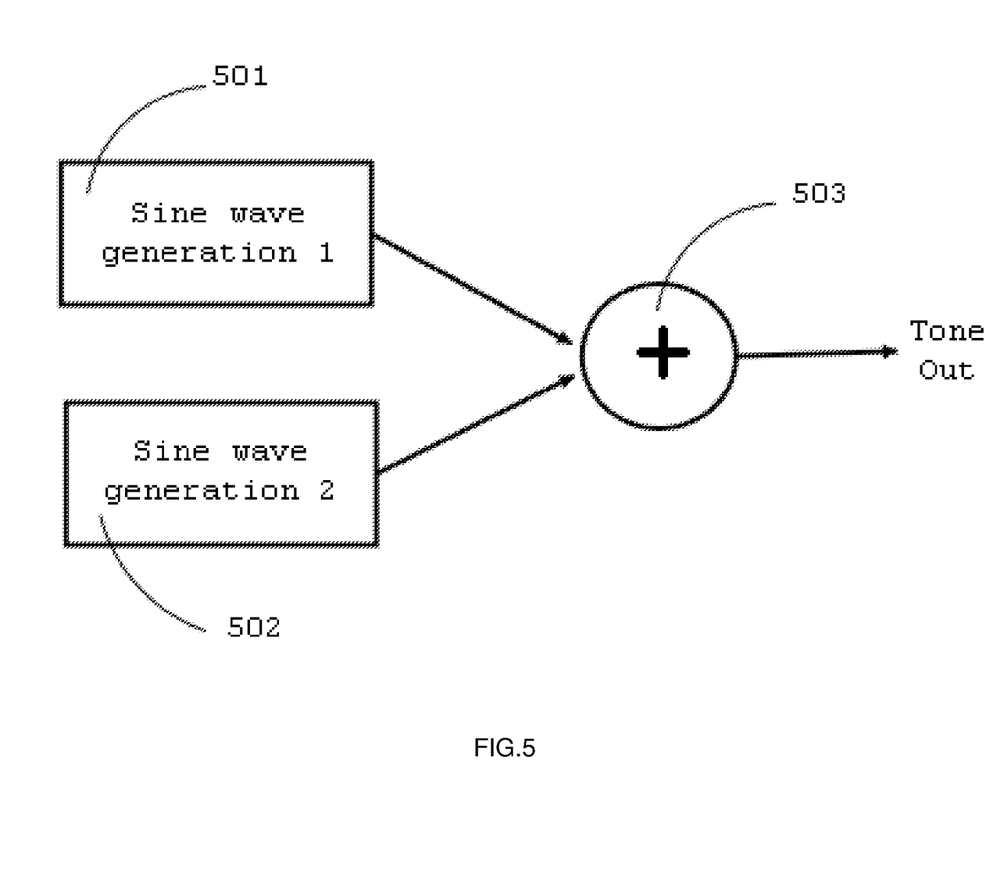
FIG. 5 is a flow chart of the DTMF, call process tone, and CAS tone generation of FIG. 1.

DTMF tone, call progress tone and CAS tone are generated by the superposition of signals of two frequency. The DSP 103 is used to perform the generation of sine wave. As shown in FIG. 5, a signal of one frequency is generated by one sine wave generation 501, and a signal of another frequency is generated by another sine wave generation 502. The two sine waves are then added together in a module 503, for superposition of the required tone.

Figure 6:
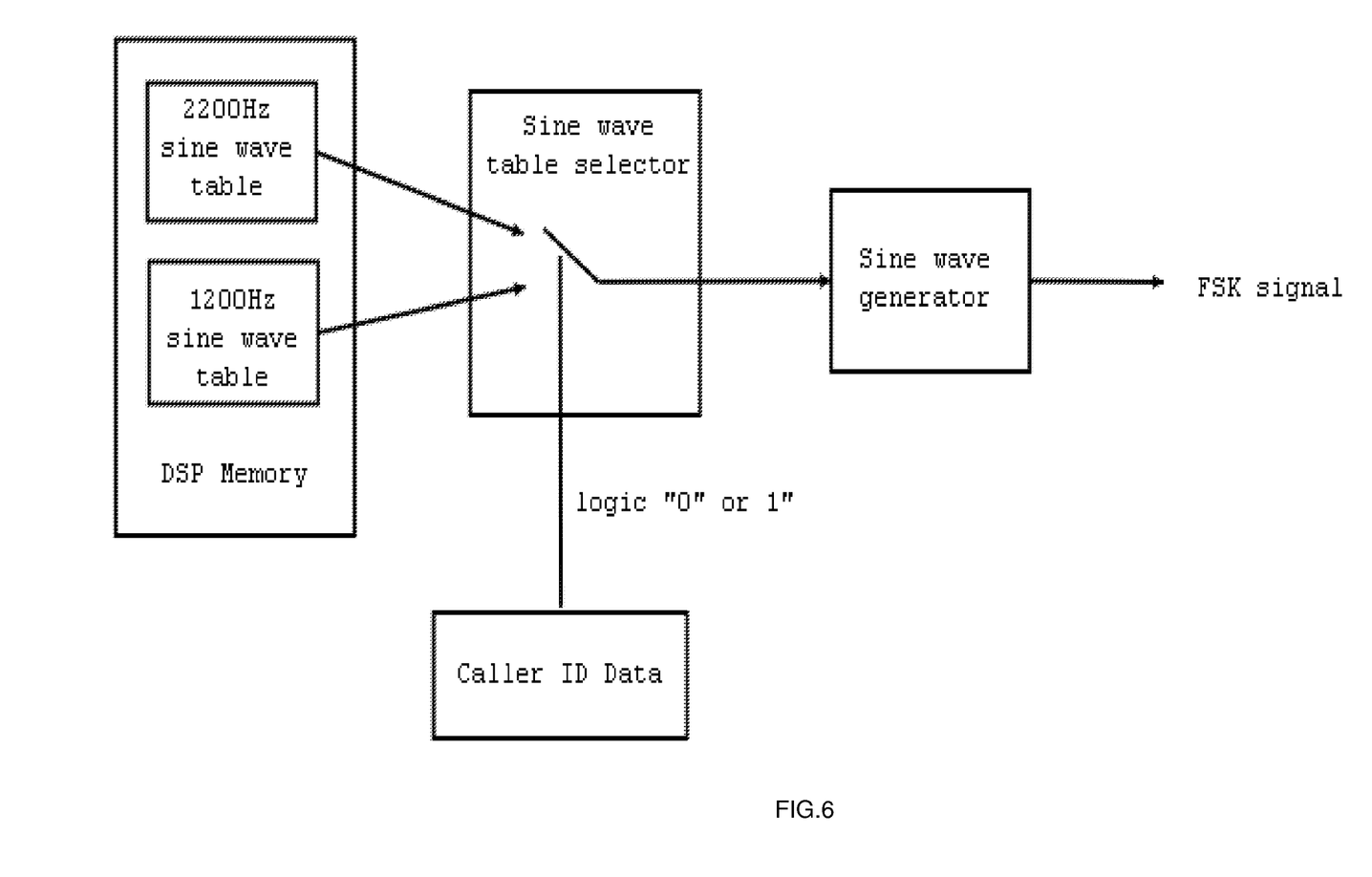
FIG. 6 is a flow chart of the FSK, caller ID signal generation of FIG. 1.

The FSK signal used for Caller ID is compatible with the BELL202 standard. For Caller ID FSK, a 2200 Hz sine wave represents logic "1", and a 1200 Hz sine wave represents logic "0". The DSP 103 is used to perform generation of the FSK signal. Referring to FIG. 6, the two signals are generated by using a lookup table methodology. Two sine wave tables are built that correspond to the 1200 Hz and 2200 Hz signals. The baud rate of Caller ID signal is 1200 bps. Hence, every 8.33 ms, a byte of Caller ID data is obtained, and together with the start bit and stop bit, thereby forming a 10 bits of data. Every 0.833 ms, a bit of data is outputted as FSK. If the data bit to be outputted is zero, a 2200 Hz signal is generated. If the data bit to be outputted is one, a 1200 Hz signal is generated. It is repeated, until the entire Caller ID is completely sent.

Figure 7:
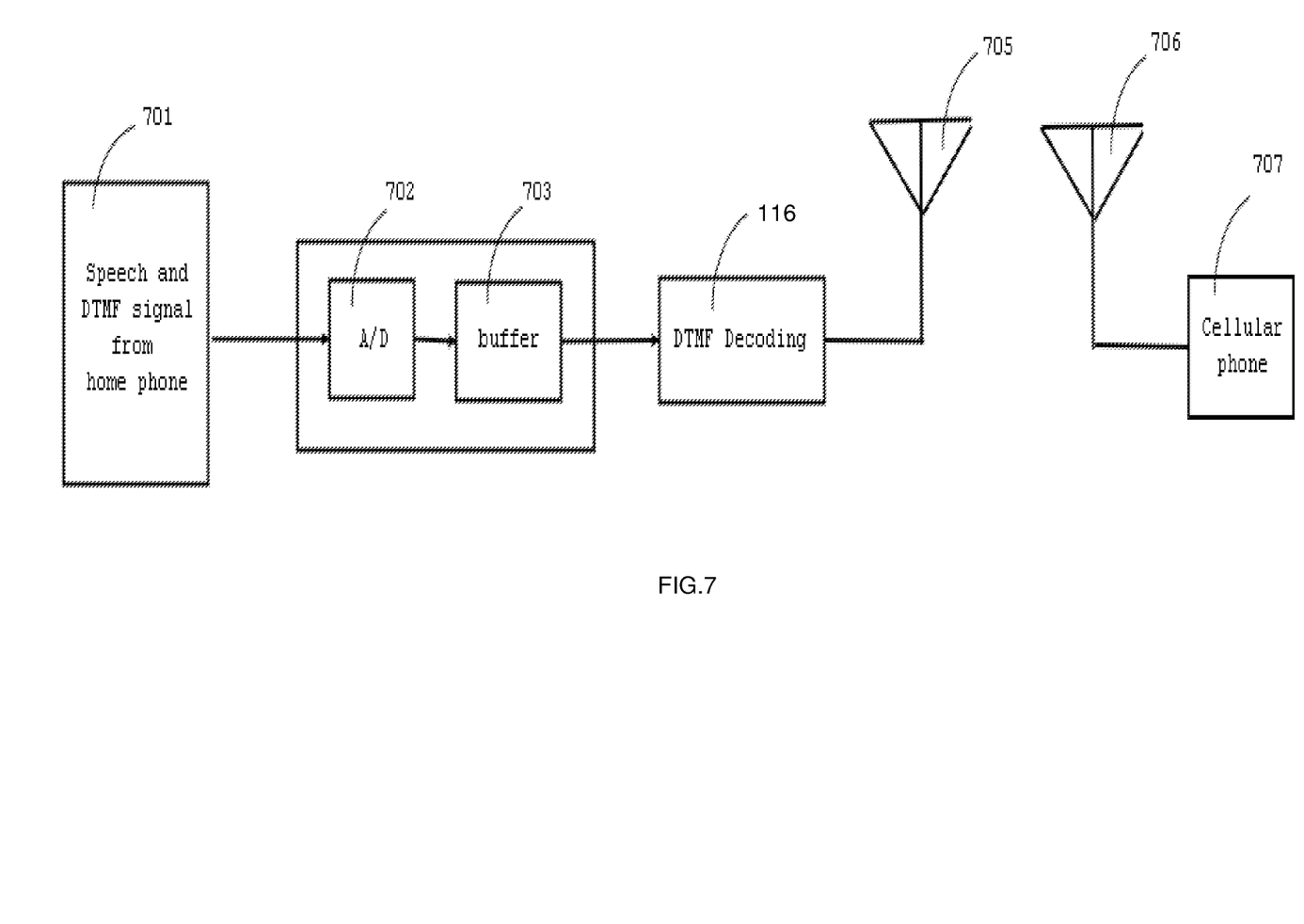
FIG. 7 is a flow chart of the accurate DTMF dialing/sending of FIG. 1.

As shown in FIG. 7, a speech and DTMF signal coming from the home phone block 701 is inputted to an A/D converter 702, and then is sent to a buffer 703 of the CPU 102 for temporary storage (about 60 ms), which would cause a 60 ms delay before the signal is sent to a cellular phone 707. At the same time, the A/D converted signal is sent to DTMF decoding 116, which is already described in FIG. 2. If no DTMF signal is detected, the signal (speech) will be sent out to the cellular phone 707 without any modification. If a DTMF tone, using method as described in FIG. 2, is detected, then the signal will be muted. In other words, the cellular phone 707 would receive a signal of zero voice level. At the same time, the CPU 102 of FIG. 1 will send a DTMF dialing instruction to the cellular phone 707, to cause the cellular phone 707 to dial a same DTMF tone. Because the DTMF tone is generated by the cellular phone 707 after receiving the instruction, the problem of distortion which may occurs during the Bluetooth RF signal transmission of a analog DTMF signal is avoided. Otherwise, if the DTMF tone is distorted, the receiving party will not be able to detect which DTMF tone is being sent. Furthermore, because the DTMF tone from the home phone has been muted, only the DTMF tone generated by the cellular phone 707 would be received at the receiving party, thus the problem of double DTMF tone dialing/switching is avoided.

Figure 8:
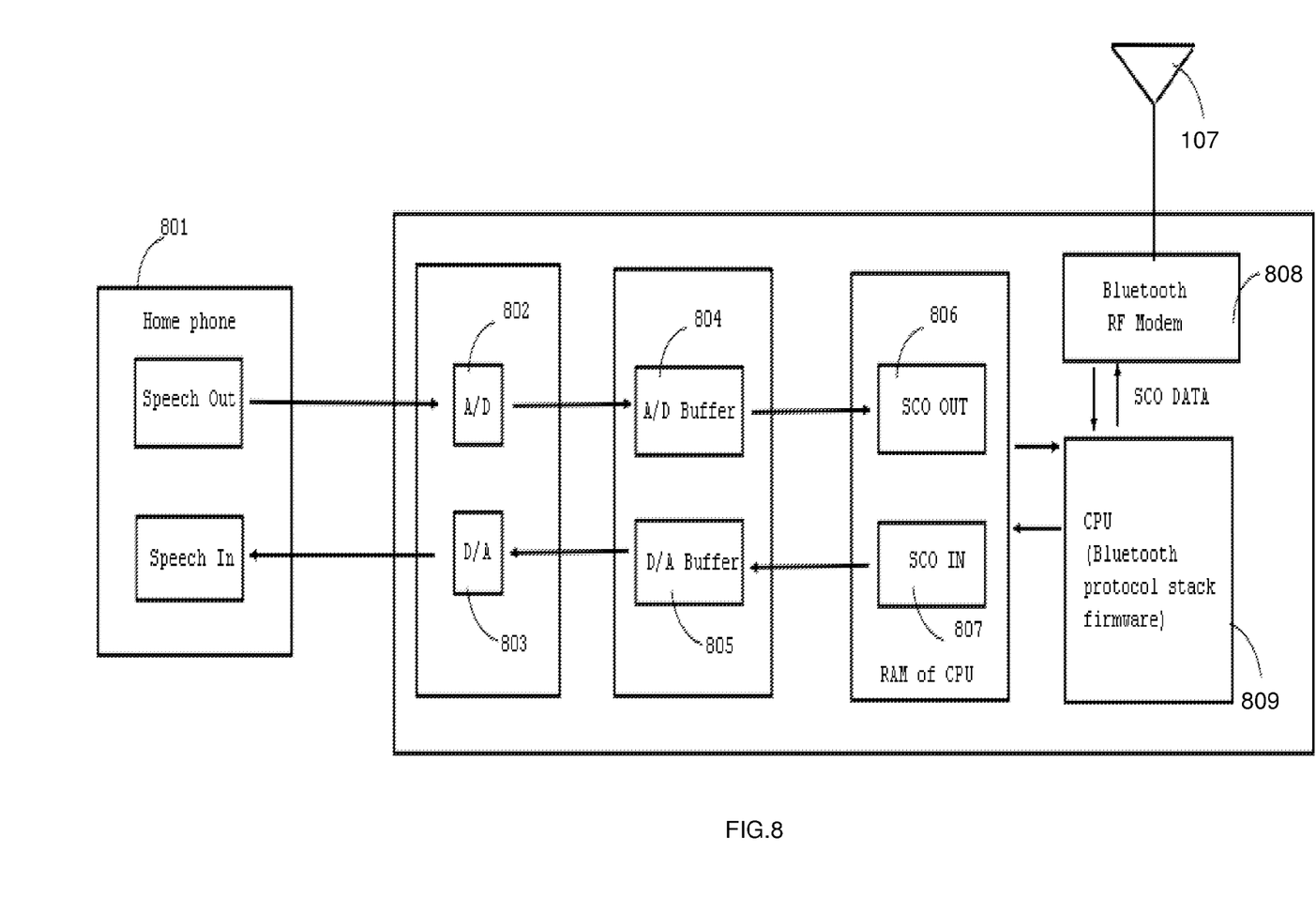
FIG. 8 is a flow chart of a Bluetooth RF phone and a home phone speech conversion of FIG. 1.

Referring to FIG. 8, for Bluetooth RF/home phone speech conversion, the conversion of Bluetooth RF signal to home phone speech and vice-versa, is to convert signals (speech) transmitted from the home phone to the cellular phone into signals recognizable by the cellular phone, and vice-versa, to convert the signals transmitted from the cellular phone to the home phone into signal (speech) recognizable by the home phone. In fact, said conversion is a mature technology and is generally contained and built-in in Bluetooth IC chip available in the market. The present embodiment uses DSP technology by using the DSP 103 of FIG. 1 to enhance the performance of said signal conversion and transmission.

Said signal conversion and transmission between the home phone and the cellular phone (via the Bluetooth RF antenna 107) are shown in FIG. 8. Wherein a Bluetooth RF modem 808, a CPU with Bluetooth protocol stack firmware 809, a synchronous connection oriented (SCO) Out buffer 806, a SCO In buffer 807 are all built-in in the market available IC 100 of FIG. 1. The Bluetooth RF communication protocol uses SCO link protocol. For enhancing the reliability of the conversion and communication, the present embodiment uses the built-in DSP 103 of FIG. 1 to perform an A/D buffer 804 for data storage before the data output to the SCO Out buffer 806; and a D/A buffer 805 for data storage of data input from the SCO In buffer 807. The using of these two buffers will help to keep the synchronization of connection during said SCO signal conversion and communication, and thus increase the capability of anti-interference of noise. This is useful especially under noisy or longer range condition/environment.

An voice prompt is acted as an aid for guiding the user throughout operation. According to the status of operation, the CPU 103 sends different commands to the CODEC 104 for generating difference voice phrase. A voice synthesizer is running in the CODEC 104. It obtains voice data from ROM and then decodes the data. The decoded data is then passed to audio codec for voice signal generation.

Figure 9:
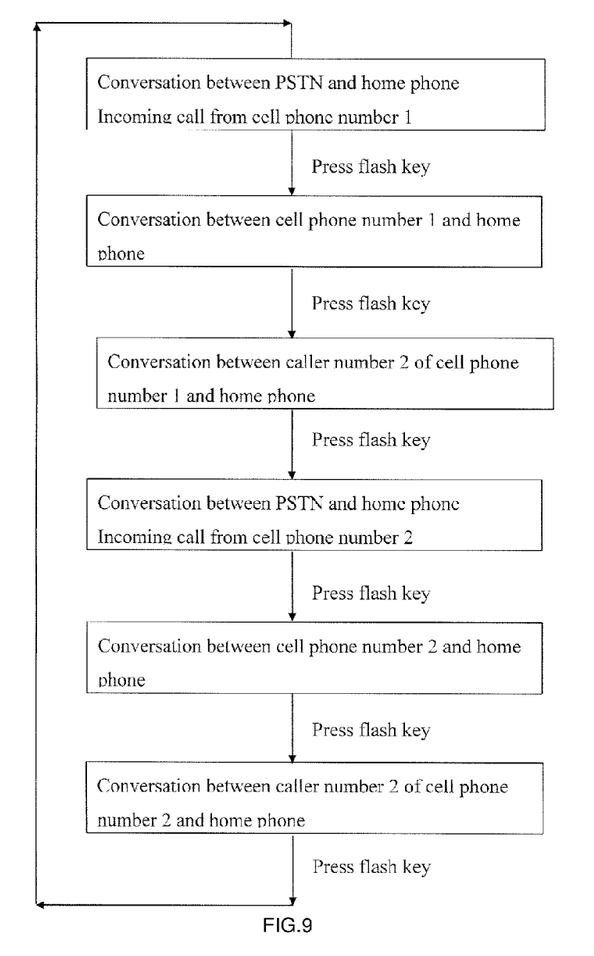
FIG. 9 is a flow chart of handling multi-calls from multi-lines by a home phone.

Referring to FIG. 9, the telephone apparatus has the capability of handling multi-calls from multi-lines by the home phone. As shown in FIG. 1, call to said telephone apparatus may come from:

1. From cellular phone(s) via the Bluetooth RF antenna 107, or

2. From PSTN line via PSTN phone jack 112.

If there is a call in progress by using the home phone with the PSTN line, and if there is a cellular phone call ringing and coming in, the DSP 103 of FIG. 1 will generate a call waiting CAS tone and Caller ID signal and send them to the home phone, and then the user can just press the Flash key of the home phone to switch to receive the cellular phone incoming call. If there is a phone conversation in progress by using the home phone and the cellular phone lines, and if a second call of the same cellular line, in other words, call waiting is coming in, the DSP 103 of FIG. 1 will then generate a call waiting CAS tone and Caller ID signal, and send them to the home phone. The user can then press the Flash key of the home phone to switch to receive the cellular phone call on waiting.

A plurality of cellular phones can be registered and connected to said telephone apparatus. If two cellular phones are registered and connected, then the home phone can switch to receive different cellular phone calls and PSTN phone call, and corresponding different calls on waiting, by pressing of Flash key, as shown in FIG. 9.

The communication link between said telephone apparatus and the cellular phone is programmed by the CPU 102 using the RF signal. The link between said telephone apparatus and the home phone, which can be a corded or a cordless phone, is accomplished simply by conventional phone cord wire. Further, said telephone apparatus can further be combined with a multi-handset home cordless phone system by adding a set of DECT 1.8/1.9 GHz cordless phone IC chip.

It is believed that the present invention and its advantages will be understood from the foregoing description, and it will be apparent that various changes may be made thereto without departing from the spirit and scope of the invention or sacrificing all of its material advantages, the examples hereinbefore described merely being exemplary embodiments of the invention.

We claim:

1. A telephone apparatus which can transfer a first phone call from a Bluetooth enabled cellular phone to a home phone and, make a second cellular phone call from the home phone via a Bluetooth enabled cellular phone, comprising:
    a Bluetooth enabled integrated chip (IC) comprising:
    a Bluetooth modem configured for receiving a Bluetooth signal from a Bluetooth radio frequency (RF) antenna of the cellular phone;
    a central processing unit (CPU) built-in the IC, for switching controlling of transferring between the first phone call and the second phone call, the CPU comprising a buffer, and
    a digital signal processor (DSP) and a CODEC (Coder-Decoder) built-in the IC;
    wherein a received Bluetooth signal is processed into speech and, vice-versa, speech is processed into a Bluetooth signal by the built-in DSP and CODEC in the Bluetooth IC by DSP processing; dual tone multiple frequency (DTMF) dialing tone, Caller ID frequency shift keying (FSK) signal, call waiting channel associated signaling (CAS) tone, call progress tone are also generated and decoded or detected by the built-in DSP by DSP processing, a DTMF and speech signal received from the home phone is temporary stored in the buffer of the CPU first for DTMF detection, and when DTMF is detected, the DTMF signal is muted and the cell phone receives a signal of zero voice level, and the CPU sends a dialing instruction to the cellular phone for dialing a same DTMF tone directly from the cell phone, instead of sending out the received DTMF tone from the Bluetooth IC; wherein the DSP is used to generate at least two sine wave signals based on received signal frequencies for superposition of a required tone.

2. The telephone apparatus of claim 1, wherein synchronous connection oriented (SCO) link protocol is used for conversion and transmission of the Bluetooth RF signal to the speech and from the speech to Bluetooth RF signal, and further an A/D (Analog/Digital) buffer for storage of data before the data are outputted to an SCO out buffer; and a D/A (Digital/Analog) buffer for storage of data inputted from an SCO In buffer, for enhancing the reliability of the conversion and transmission; and said two buffers are performed by the built-in DSP in the Bluetooth IC.

3. The telephone apparatus of claim 2, further comprising capability or means for registering a plurality of cellular phones to said telephone apparatus, wherein a Flash key of a home phone is used to switch the home phone to receive an incoming call from a plurality of cellular phone or from the public switched telephone network (PSTN) line, and can further switch to receive different corresponding calls on waiting.

4. The telephone apparatus of claim 1, wherein further comprising voice assistance setup and/or operation prompt.

5. The telephone apparatus of claim 4, further comprising capability or means for registering a plurality of cellular phones to said telephone apparatus, wherein a Flash key of a home phone is used to switch the home phone to receive an incoming call from a plurality of cellular phones or from the public switched telephone network (PSTN) line, and can further switch to receive different corresponding calls on waiting.

6. The telephone apparatus as claimed in claim 1, further comprising capability or means for registering a plurality of cellular phones to said telephone apparatus, wherein a Flash key of a home phone is used to switch the home phone to receive an incoming call from a plurality of cellular phones or from the public switched telephone network (PSTN) line, and can further switch to receive different corresponding calls on waiting.

7. A telephone apparatus which can transfer a first phone call from a Bluetooth enabled cellular phone to a home phone and, make a second cellular phone call from the home phone via a Bluetooth enabled cellular phone, comprising;
    a Bluetooth enabled integrated chip (IC) comprising;
    a Bluetooth modem configured for receiving a Bluetooth signal from a Bluetooth radio frequency (RF) antenna of the cellular phone;
    a central processing unit (CPU) built-in the IC, for switching controlling of transferring between the first phone call and the second phone call, the CPU comprising a buffer, and
    a digital signal processor (DSP) and a CODEC built-in the IC;
    wherein a received Bluetooth signal is processed into speech and, vice-versa, speech is processed into a Bluetooth signal by the built-in DSP and CODEC in the Bluetooth IC by DSP processing; dual tone multiple frequency (DTMF) dialing tone, Caller ID frequency shift keying (FSK) signal, call waiting channel associated signaling (CAS) tone, call progress tone are also generated and decoded or detected by the built-in DSP by DSP processing, and when DTMF is detected, the detected DTMF signal is muted and the cell phone receives a signal of zero voice level from the Bluetooth IC, and the CPU sends a dialing instruction to the cellular phone to directly dial a same DTMF tone from the cell phone; and the DSP firstly checks a power level and twist of DTMF, then checks a frequency of DTMF to see if a match of preset frequencies is detected, and then checks a duration of DTMF to see if the duration is more than a preset value;
    wherein all the above functions are all processed by the CPU software and DSP software programming which the CPU and DSP and CODEC are all embedded in one single IC chip.

8. The telephone apparatus of claim 7, wherein a DTMF and speech signal received from the home phone is temporary stored in the buffer of the CPU first for DTMF detection.

9. The telephone apparatus of claim 7, wherein synchronous connection oriented (SCO) link protocol is used for conversion and transmission of the Bluetooth RF signal to the speech and from the speech to the Bluetooth RF signal, and further an A/D (Analog/Digital) buffer for storage of data before the data are outputted to an SCO Out buffer, and a D/A (Digital/Analog) buffer for storage of data inputted from an SCO In buffer, for enhancing the reliability of the conversion and transmission; and said two buffers are performed by the built-in DSP in the Bluetooth IC.

10. The telephone apparatus of claim 7, wherein further comprising voice assistance setup and/or operation prompt.

11. The telephone apparatus of claim 8, wherein further comprising voice assistance setup and/or operation prompt.

12. The telephone apparatus of claim 9, wherein further comprising voice assistance setup and/or operation prompt.

13. The telephone apparatus of claim 7, further comprising capability or means for registering a plurality of cellular phones to said telephone apparatus, wherein a Flash key of a home phone is used to switch the home phone to receive an incoming call from a plurality of cellular phones or from the public switched telephone network (PSTN) line, and can further switch to receive different corresponding calls on waiting.

14. The telephone apparatus of claim 8, further comprising capability or means for registering a plurality of cellular phones to said telephone apparatus, wherein a Flash key of a home phone is used to switch the home phone to receive an incoming call from a plurality of cellular phones or from the public switched telephone network (PSTN) line, and can further switch to receive different corresponding calls on waiting.

15. The telephone apparatus as claimed in claim 9, further comprising capability or means for registering a plurality of cellular phones to said telephone apparatus, wherein a Flash key of a home phone is used to switch the home phone to receive an incoming call from a plurality of cellular phones or from the public switched telephone network (PSTN) line, and can further switch to receive different corresponding calls on waiting.

16. The telephone apparatus of claim 13, wherein further comprising voice assistance setup and/or operation prompt.

17. The telephone apparatus of claim 14, wherein further comprising voice assistance setup and/or operation prompt.

18. The telephone apparatus of claim 1, wherein the DSP is used to perform a low frequency band pass filter and a high frequency band pass filter.

19. The telephone apparatus of claim 1, wherein the DSP firstly checks a power level and twist of DTMF, then checks a frequency of DTMF to see if a match of preset frequencies is detected, and then checks a duration of DTMF to see if the duration is more than a preset value.

20. The telephone apparatus of claim 7, wherein the DSP is used to generate at least two sine wave signals based on received signal frequencies for superposition of a required tone.

* * * * *